United States Patent Office 2,946,764
Patented July 26, 1960

2,946,764
HEAT STABILIZED VINYL CHLORIDE RESIN PLASTISOLS

Arthur Dock Fon Toy, Park Forest, Kenneth H. Rattenbury, South Chicago Heights, and Thomas M. Hinkes, Park Forest, Ill., assignors to Victor Chemical Works, a corporation of Illinois No Drawing. Filed May 24, 1957, Ser. No. 661,297

17 Claims. (Cl. 260—45.7)

This invention relates to heat stabilized vinyl chloride resin plastisols containing dibutyl benzenephosphonite as a heat stabilizer.

It is well recognized that vinyl chloride resins are somewhat unstable under the influence of heat and light exposure causing the resin to become dark colored and undesirable for many uses. The cause of discoloration is believed to be due to the degradative effect of traces of hydrogen chloride resulting from the slight decomposition of the vinyl chloride in the resin composition.

The term "vinyl chloride resin" includes polyvinyl chloride polymers and the various copolymers of vinyl chloride formed by polymerizing vinyl chloride with other copolymerizable materials (i.e., ethylenically unsaturated monomers) such as vinyl acetate, vinyl butyrate, ethyl acrylate, methyl methacrylate, vinylidene chloride, and the like, wherein vinyl chloride is the major component (more than 50% by weight) of the resin composition.

"Plastisol" is herein intended to refer to vinyl chloride resin dispersions which contain a plasticizer which serves as the dispersing medium.

Heretofore, a large number of different compounds such as the barium cadmium and tin salts of certain carboxylic acids such as exemplified by long chain fatty acids, have been used as heat and light stabilizers for the vinyl chloride resin compositions. These stabilizers are fairly satisfactory for short periods of exposure to heat but do not give satisfactory stabilization in plastisol formulations which may be heated during processing to temperatures of 350° F. for more than fifteen minutes.

It has now been found that the addition of a small amount of dibutyl benzenephosphonite to a vinyl chloride resin plastisol will stabilize the resin against the adverse effect of heat to about the same extent as do stabilizers such as metal salts of carboxylic acids and that when used in combination with such stabilizers, the stabilizing effect is enhanced over that of either of the stabilizing components alone.

Plastisol compositions are known in the art as a type of vinyl chloride resin dispersion in which the proportion of plasticizer is high enough to be the sole dispersion medium, thus providing a liquid or paste composition which may be used for producing moldings or coatings without the presence of a volatile solvent component. The amount of plasticizer which may be employed is not too critical so long as the proportion used is sufficient to impart the desired degree of plasticity to the finished product. Generally, the amount of plasticizer ranges from about half to an equal amount by weight of the vinyl chloride resin.

In the preparation of such plastisol compositions, the ingredients are mixed and milled together in a suitable mill for a sufficient period to effect an intimate suspension or dispersion of the finely divided particles. The resulting mixed material is then molded or formed in the desired shape or coating and subjected to sufficient heat to fuse the mass into usable plastic products. It is generally necessary to heat the plastisol composition to a temperature of about 325°–350° F. for a sufficient period to cause fusion throughout the full thickness of the resin section. After fusion is effected, further curing, produced by heating, causes the plastisol composition to solidify forming the resin product. Without the presence of a heat stabilizing agent, the vinyl chloride resin would become badly discolored during such heating periods.

The plastisol compositions which are contemplated by the present invention are formed by mixing and milling together a vinyl chloride resin, a plasticizer, and a heat stabilizing amount of a stabilizing agent containing dibutyl benzenephosphonite.

Various commercial plasticizers, known to be suitable for use with vinyl chloride resins, may be satisfactorily used in the plastisol compositions herein described. These plasticizers include dioctyl phthalate, trioctyl phosphate, tricresyl phosphate, acetyl tributyl citrate, diphenyl octylphosphate, dioctyl chloromethanephosphonate, etc.

Polyvinyl chloride polymers and the various copolymers of vinyl chloride and vinyl acetate exemplify the various vinyl chloride resins which are suitable for use in the plastisol compositions of this invention. Such resins are available on the market under such trade names as "Vinylite," and "Geon," etc.

In formulating a typical plastisol composition, 50 grams of polyvinyl chloride resin (i.e., Vinylite QYNV), 30 grams of dioctyl phthalate plasticizer, and 1.5 grams of dibutyl benzenephosphonite stabilizer were milled together in a ball mill to form a homogeneously dispersed mixture. The mixture was deaerated by subjecting it to vacuum, and then poured into circular aluminum trays which measured 2½ inches in diameter and 5/16 inch deep. The trays were placed in a furnace and heated to 350° F. for about 15 minutes to completely fuse and cure the resin discs. The cured discs were cooled and compared for discoloration with fused plastisols which did not contain the stabilizer but were fused and cured under the same temperature and time conditions. The dibutyl benzenephosphonite stabilized product was of very pale color compared to a very unsatisfactory dark color for the unstabilized product.

In order to more accurately point out the heat stability characteristics of our new plastisol compositions, a series of test discs were made up with different amounts of the dibutyl benzenephosphonite stabilizing agent using various plasticizing agents. These compositions were fused at 350° F. for periods of 15, 30 and 45 minutes and evaluated by observing their relative change in color. The color evaluation was denoted by the following numerical grades:

NUMERICAL COLOR SCALE

| Color Number | Description |
| --- | --- |
| 0 | No color (water-white). |
| 1 | Very pale (amber, red, or any other hue). |
| 2 | Pale (amber, red, or any other hue). |
| 3 | Light (amber, red, or any other hue). |
| 4 | Medium (amber, red, or any other hue). |
| 5 | Dark (amber, red, or any other hue). |

Table I shows the relative heat stability in terms of the degree of color developed in fusing and curing plastisol compositions consisting of 50 parts by weight of polyvinyl chloride (i.e., Vinylite QYNV), 30 parts by weight of the designated plasticizer and the indicated levels of dibutyl benzenephosphonite at a temperature of 350° F. for the indicated periods of time. For comparative purposes, the table shows control values for unstabilized plastisols and plastisols stabilized with some of the presently used stabilizers such as cadmium stearate, barium-cadmium stearate, dibutyl-tin dilaurate, etc.

Table I

| Stabilizer | Parts by Weight Stabilizer (per 50 parts of resin) | Plasticizer (30 parts by weight) | Plastisol Color Number After Heating Period | | |
|---|---|---|---|---|---|
| | | | 15 min. | 30 min. | 45 min. |
| None | None | Dioctyl phthalate | 5 | 5 | 5 |
| Cadmium Stearate | 1.5 | do | 0 | 2 | 4 |
| Do | 2.5 | do | 0 | 2 | 3 |
| Barium Stearate | 1.5 | do | 3 | 4 | 5 |
| Barium-cadmium stearate | 1.5 | do | 2 | 3 | 3 |
| Dibutyl-tin dilaurate | 1.5 | do | 2 | 5 | 5 |
| Dibutyl benzenephosphonite | 1.5 | do | 1 | 3 | 5 |
| Do | 2.5 | do | 1 | 3 | 4 |
| Do | 1.5 | Dioctyl chloromethanephosphonate | 1 | 5 | 5 |
| Cadmium stearate | 1.5 | do | 1 | 5 | 5 |
| Barium stearate | 1.5 | do | 4 | 5 | 5 |
| Dibutyl-tin dilaurate | 1.5 | do | 3 | 5 | 5 |
| Barium-cadmium stearate | 1.5 | do | 2 | 5 | 5 |
| Barium-cadmium laurate | 1.5 | do | 3 | 4 | 5 |
| Do | 2.5 | do | 3 | 4 | 4 |

From the results shown in Table I, it is seen that dibutyl benzenephosphonite is (1) a commercially satisfactory heat stabilizer for vinyl chloride resin plastisol compositions, (2) substantially equal to the best presently known stabilizers, and (3) better than many of the stabilizers now employed.

Dibutyl benzenephosphonite is not only a useful heat stabilizer for vinyl chloride resin plastisols when it is the sole stabilizer employed, but, in addition, is quite effective when used in combination with the presently used metal stabilizing agents which are salts of carboxylic acids such as stearic, maleic, lauric, oxalic, formic, etc. The combined use of such stabilizers is particularly effective in plastisol compositions containing organic phosphate and phosphonate plasticizing agents; such plasticizers have not previously been used to any great extent in vinyl chloride resin plastisols because of the lack of a satisfactory heat stabilizer.

Table I shows that none of the conventional commercial stabilizers listed have satisfactory stabilizing effect when dioctyl chloromethanephosphonate is the plasticizer. On the other hand, the plastisols tested in Table II show that when such stabilizers are used in combination with dibutyl benzenephosphonite, excellent stability of the vinyl chloride resin plastisols which contain phosphate and phosphonate plasticizers is obtained over heating periods of 15 to 45 minutes at 350° F.

Table II shows a number of samples of plastisol compositions made by milling together 50 parts by weight of polyvinyl chloride resin (i.e., Vinylite QYNV), 30 parts by weight of the designated plasticizer and the indicated levels of dibutyl benzenephosphonite and metal carboxylate stabilizers. The plastisol compositions were poured into circular aluminum trays (2.5" dia.—3/16" deep) and heated to 350° F. for periods of 15 to 45 minutes to completely fuse and cure the resin discs. The heat stabilities of the resin discs were determined by comparing the developed color of the discs at 15, 30 and 45 minute heating periods. The color numbers in the table show values of relative heat stability in terms of the above-described color scale.

Table II

| Stabilizer | Parts by Weight Stabilizer (per 50 parts of resin) | Plasticizer (30 parts by weight) | Plastisol Color Number After Heating Period | | |
|---|---|---|---|---|---|
| | | | 15 min. | 30 min. | 45 min. |
| Cadmium stearate | 1.5 | Dioctyl phthalate | 0 | 0 | 1 |
| DBBP [1] | 1.5 | | | | |
| Barium stearate | 1.5 | do | 2 | 3 | 4 |
| DBBP | 1.5 | | | | |
| Sodium oxalate | 1.5 | do | 1 | 3 | 4 |
| DBBP | 1.5 | | | | |
| Barium-cadmium stearate | 1.5 | do | 1 | 2 | 2 |
| DBBP | 1.5 | | | | |
| Dibutyl-tin dilaurate | 1.5 | do | 0 | 2 | 4 |
| DBBP | 1.5 | | | | |
| Dibutyl-tin maleate | 1.5 | do | 0 | 2 | |
| DBBP | 1.5 | | | | |
| Barium-cadmium laurate | 1.5 | Dioctyl chloromethanephosphonate | 0 | 2 | 5 |
| DBBP | 1.5 | | | | |
| Barium-cadmium laurate | 1.5 | do | 0 | 0 | 2 |
| DBBP | 2.5 | | | | |
| Barium-cadmium laurate | 1.5 | do | 0 | 0 | 1 |
| DBBP | 3.0 | | | | |
| Barium-cadmium laurate | 2.5 | do | 0 | 0 | 1 |
| DBBP | 2.5 | | | | |
| Barium-cadmium stearate | 1.5 | do | 0 | 0 | |
| DBBP | 3.0 | | | | |
| Cadmium stearate | 1.5 | do | 0 | 3 | 5 |
| DBBP | 3.0 | | | | |
| Barium stearate | 1.5 | do | 1 | 3 | 4 |
| DBBP | 3.0 | | | | |
| Dibutyl-tin dilaurate | 1.5 | do | 0 | 2 | 4 |
| DBBP | 3.0 | | | | |
| Barium-cadmium laurate | 1.5 | Trioctyl phosphate | 0 | 1 | 5 |
| DBBP | 3.0 | | | | |
| Barium-cadmium laurate | 1.5 | Diphenyl octyl phosphate | 0 | 0 | 1 |
| DBBP | 3.0 | | | | |

[1] DBBP is dibutyl benzenephosphonite.

The examples in Table II illustrate that increased heat stability of vinyl chloride resin plastisol compositions results from the use of various levels of dibutyl benzenephosphonite together with various heat stabilizing agents and plasticizing agents. The results are particularly good where the fusion and curing periods are extended to 30 and 45 minutes at temperatures of about 350° F. This increased stability is especially important in the forming of complicated molded plastic objects which often require long periods of time to effect uniform fusion, curing, and molding.

The levels of the stabilizing agents required to effect suitable heat stabilization of the plastisol compositions will vary to some extent depending on the type of stabilizing agents and plasticizers employed. In general, satisfactory results are obtained with the use of about 3–6% of the metal carboxylate-type agent together with from 3 to 6% of dibutyl benzenephosphonite, based on the weight of vinyl chloride resin in the plastisol composition. For example, as illustrated in Table II, all of the compositions employing the above proportions of stabilizing agents are substantially completely stabilized during the 15 minute heating period at about 350° F. Similarly, all such compositions are satisfactorily stabilized for 30 minute heating periods. For stabilization at longer periods of heating, it is desirable to use the higher levels of the stabilizing agents in their respective ranges.

For convenience and for the purpose of facilitating the dispersion of the above stabilizing agents in the plastisol composition, we have found that the dibutyl benzenephosphonite can be premixed with the plasticizer to give a stabilizing plasticizer which can be more efficiently mixed with the vinyl chloride resin to form the plastisol composition. For example, it has been found that as high as 12% by weight dibutyl benzenephosphonite, based on the weight of the plasticizer plus stabilizer, will dissolve in plasticizers such as dioctyl chloromethanephosphonate, dioctyl phthalate and trioctyl phosphate to form clear stabilizing plasticizer solutions.

It has also been found that the combinations of heat stabilizers discussed above may be suitably prepared in the form of smooth paste compositions which are easily dispersible in the plastisol compositions. For example, heat stabilizing paste compositions containing one to two parts by weight dibutyl benzenephosphonate per part by weight metal carboxylate are quite convenient from the standpoint of packaging and shipping and greatly facilitate the proportioning and mixing operations for the manufacturer of finished resin products.

The foregoing detailed description has been given for clearness of understanding only, and no unnecessary limitations should be understood therefrom, as modifications will be obvious to those skilled in the art.

We claim:

1. A plastisol composition comprising a vinyl chloride resin, a vinyl chloride plasticizer, and a heating stabilizing amount of dibutyl benzenephosphonite.

2. A plastisol composition comprising about 1 part by weight vinyl chloride resin, about ½–1 part by weight of a vinyl chloride plasticizer, and about 0.03–0.06 part by weight dibutyl benzenephosphonite.

3. A plastisol composition comprising vinyl chloride resin, a vinyl chloride plasticizer, and a heat stabilizing amount of stabilizer containing dibutyl benzenephosphonite and a stabilizing metal salt of an aliphatic carboxylic acid from the group consisting of cadmium stearate, barium stearate, sodium oxalate, barium-cadmium stearate, barium-cadmium laurate, dibutyl-tin dilaurate, and dibutyl-tin maleate.

4. A plastisol composition comprising about 1 part by weight vinyl chloride resin, about ½–1 part by weight of a vinyl chloride plasticizer, about 0.03–0.06 part by weight of a stabilizing metal salt of an aliphatic carboxylic acid from the group consisting of cadmium stearate, barium stearate, sodium oxalate, barium-cadmium stearate, barium-cadmium laurate, dibutyl-tin dilaurate, and dibutyl-tin maleate, and about 0.03–0.06 part by weight dibutyl benzenephosphonite.

5. A plastisol composition comprising about 50 parts by weight vinyl chloride resin, about 30 parts by weight dioctyl chloromethanephosphonate, and about 1.5–3 parts by weight dibutyl benzenephosphonite.

6. A plastisol composition comprising about 50 parts by weight of vinyl chloride resin, about 30 parts by weight dioctyl phthalate, and about 1.5–3 parts by weight dibutyl benzenephosphonite.

7. A plastisol composition comprising about 50 parts by weight of vinyl chloride resin, about 30 parts by weight dioctyl phthalate, and a heat stabilizing mixture of about 1.5–3 parts by weight dibutyl benzenephosphonite, and about 1.5–3 parts by weight cadmium stearate.

8. A plastisol composition comprising about 50 parts by weight vinyl chloride resin, about 30 parts by weight dioctyl chloromethanephosphonate, and a heat stabilizing mixture of about 1.5–3 parts by weight dibutyl benzenephosphonite and about 1.5–3 parts by weight barium-cadmium laurate.

9. A plastisol composition comprising about 50 parts by weight vinyl chloride resin, about 30 parts by weight diphenyl octylphosphate, and a heat stabilizing mixture of about 1.5–3 parts by weight dibutyl benzenephosphonite and about 1.5–3 parts by weight barium-cadmium laurate.

10. A heat stabilizing composition for vinyl chloride resin plastisol compositions comprising a mixture of dibutyl benzenephosphonite and a stabilizing metal salt of an aliphatic carboxylic acid from the group consisting of cadmium stearate, barium stearate, sodium oxalate, barium-cadmium stearate, barium-cadmium laurate, dibutyl-tin dilaurate, and dibutyl-tin maleate.

11. The heat stabilizing composition of claim 10 wherein the metal salt of the aliphatic carboxylic acid is a member of the group consisting of cadmium stearate, barium stearate, sodium oxalate, barium-cadmium stearate, barium-cadmium laurate, dibutyl-tin dilaurate, and dibutyl-tin maleate.

12. The heat stabilizing composition of claim 10 wherein the metal salt is cadmium stearate.

13. The heat stabilizing composition of claim 10 wherein the metal salt is barium-cadmium laurate.

14. A heat stabilizing composition for vinyl chloride resin plastisol compositions comprising about 1–2 parts by weight of dibutyl benzenephosphonite and about 1 part by weight of a stabilizing metal salt of an aliphatic carboxylic acid from the group consisting of cadmium stearate, barium stearate, sodium oxalate, barium-cadmium stearate, barium-cadmium laurate, dibutyl-tin dilaurate, and dibutyl-tin maleate.

15. A heat stabilizing plasticizer composition for vinyl chloride resin plastisol compositions comprising a vinyl chloride plasticizer liquid having dissolved therein from 6 to 12% by weight dibutyl benzenephosphonite.

16. The heat stabilizing plasticizer composition of claim 15 wherein the plasticizer is dioctyl chloromethanephosphonate.

17. The heat stabilizing plasticizer composition of claim 15 wherein the plasticizer is dioctyl phthalate.

References Cited in the file of this patent

UNITED STATES PATENTS

| | | |
|---|---|---|
| 2,516,980 | Gray et al. | Aug. 1, 1950 |
| 2,543,635 | Loritsch | Feb. 27, 1951 |
| 2,564,646 | Leistner et al. | Aug. 14, 1951 |
| 2,647,296 | Shive | Aug. 4, 1953 |

FOREIGN PATENTS

| | | |
|---|---|---|
| 915,984 | Germany | Aug. 2, 1954 |

UNITED STATES PATENT OFFICE

CERTIFICATE OF CORRECTION

Patent No. 2,946,764                        July 26, 1960

Arthur Dock Fon Toy et al.

It is hereby certified that error appears in the printed specification of the above numbered patent requiring correction and that the said Letters Patent should read as corrected below.

Column 6, line 18, strike out the entire claim beginning with "11. The heat stabilizing" and ending with "butyl-tin maleate." in line 23, same column 6; same column 6, the claims numbered 12 through 17 should be renumbered as claims 11 through 16; lines 41 and 44, for the claim reference numeral "15", each occurrence, read -- 14 --; in the heading to the printed specification, line 9, for "17 Claims." read -- 16 Claims. --.

Signed and sealed this 4th day of April 1961.

(SEAL)
Attest:   ERNEST W. SWIDER

Attesting Officer

ARTHUR W. CROCKER
                                          Acting Commissioner of Patents